US012675347B2

(12) United States Patent
Mawkin et al.

(10) Patent No.: US 12,675,347 B2
(45) Date of Patent: Jul. 7, 2026

(54) SYSTEMS AND METHODS FOR IDENTIFYING UNREGISTERED CONSUMERS OF WEBSERVICES

(71) Applicant: FMR LLC, Boston, MA (US)

(72) Inventors: Amit Mawkin, Boston, MA (US); Shaik Sameer, Hyderabad (IN); Milind Halageri, Bengaluru (IN); Balan Vincent, Bangalore, MA (US); Peter Davies, Boston, MA (US); Jennifer Hays, Boston, MA (US)

(73) Assignee: FMR LLC, Boston, MA (US)

( * ) Notice: Subject to any disclaimer, the term of this patent is extended or adjusted under 35 U.S.C. 154(b) by 654 days.

(21) Appl. No.: 18/113,356

(22) Filed: Feb. 23, 2023

(65) Prior Publication Data

US 2024/0289195 A1      Aug. 29, 2024

(51) Int. Cl.
*G06F 9/54* (2006.01)

(52) U.S. Cl.
CPC .............. *G06F 9/546* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 9,460,169 B2 | 10/2016 | Hinton et al. | |
| 2013/0276129 A1* | 10/2013 | Nelson ............. | H04N 21/47202 726/26 |
| 2015/0378862 A1* | 12/2015 | Li ....................... | G06F 11/3476 714/38.1 |

FOREIGN PATENT DOCUMENTS

CN         113905105 A  *  1/2022  ............. H04L 69/16

* cited by examiner

*Primary Examiner* — S. Sough
*Assistant Examiner* — Selena Sabah Nahra
(74) *Attorney, Agent, or Firm* — Cesari and McKenna, LLP

(57) ABSTRACT

Computerized systems and methods are provided for identifying connection between at least one application in a set of client applications within a multi-tenant network and a service application hosted on a server. Audit logs are generated that track activities for respective ones of the client applications over a predetermined duration. Information from a first audit message of each client application is extracted that includes an audit identification and a connecting IP address associated with the corresponding client application. Information from a second audit message of each client application is extracted that includes an audit identification and a process identification of the corresponding client application. The extracted information is used to identify one or more client applications as being connected to and consuming the service application.

16 Claims, 3 Drawing Sheets

200

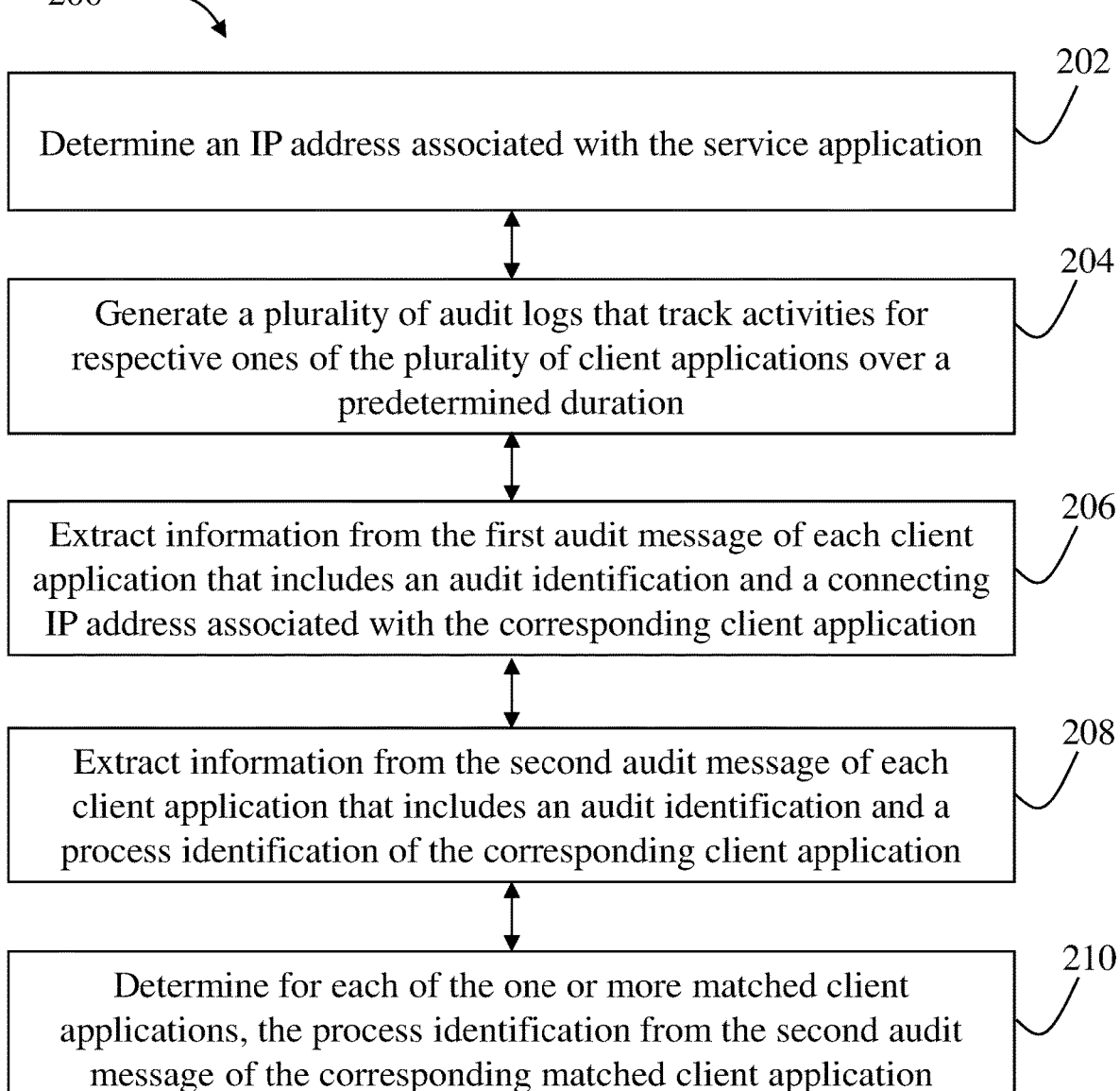

202

Determine an IP address associated with the service application

204

Generate a plurality of audit logs that track activities for respective ones of the plurality of client applications over a predetermined duration

206

Extract information from the first audit message of each client application that includes an audit identification and a connecting IP address associated with the corresponding client application

208

Extract information from the second audit message of each client application that includes an audit identification and a process identification of the corresponding client application

210

Determine for each of the one or more matched client applications, the process identification from the second audit message of the corresponding matched client application

302 type=SOCKADDR
msg=audit(1626174936.954:395313):
saddr=020022B80A5D0B070000000000000000SA
DDR={ fam=inet laddr=10.93.11.7 port=8888 }

308

310

304

312 type=SYSCALL
msg=audit(1626174936.954:395313):
arch=c000003e syscall=42 success=yes exit=0 a0=5
a1=7fd98a59f820 a2=10 a3=4 items=0 ppid=19040
pid=19057 auid=4294967295 uid=0 gid=0 euid=0
suid=0 fsuid=0 egid=0 sgid=0 fsgid=0 tty=(none)
ses=4294967295 comm="python"
exe="/usr/local/bin/python3.9"
subj=system_u:system_r:container_t:s0:c471,c646
key="tcp_connections"ARCH=x86_64
SYSCALL=connect AUID="unset" UID="root"
GID="root" EUID="root" SUID="root"
FSUID="root" EGID="root" SGID="root"
FSGID="root"

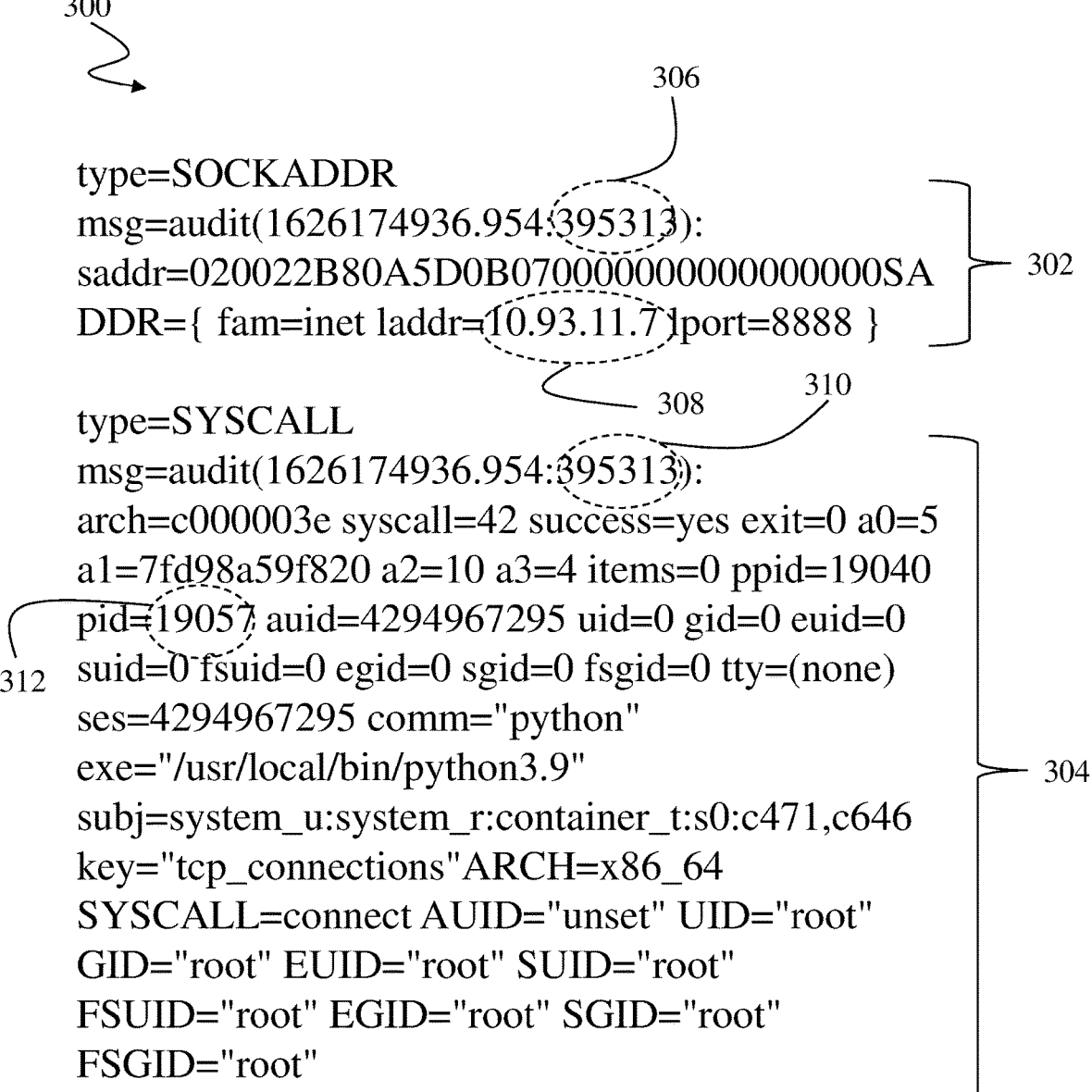

FIG. 3

SYSTEMS AND METHODS FOR IDENTIFYING UNREGISTERED CONSUMERS OF WEBSERVICES

TECHNICAL FIELD

This application relates generally to methods and apparatuses for identifying connection(s) between a set of client applications within a multi-tenant network and a service application hosted on a server.

BACKGROUND

In an organization, typical webservices can be accessed by more than hundreds of applications firmwide, where many applications share the same host in a multi-tenant network environment. Often, these webservices are legacy webservices that do not have a security layer. Identification of consuming application(s) of these legacy webservices can be difficult because traffic originates from the same IP/host. Existing solutions typically involve scanning configuration files and/or source codes to trace and find host webservice end points. However, many applications have source codes and configuration files that include misleading information. Therefore, systems and methods are needed to accurately identify one or more applications in a group of applications in a multi-tenant network environment that are connected to and consuming a host webservice of interest.

SUMMARY

In view of the above challenges, the present invention features an automated script executable in a multi-tenant environment to generate an output file identifying actual application(s) connected to a webservice of interest (e.g., a legacy webservice). In some embodiments, identification of consuming applications is completed in real time or near real time by determining the process identifications and/or container identifications of each consuming application.

The invention, in one aspect, features a computerized method for identifying connection between at least one application in a plurality of client applications within a multi-tenant network and a service application hosted on a server. The method includes determining, by a computing device, an IP address associated with the service application. The method also includes generating, by the computing device, a plurality of audit logs that track activities for respective ones of the plurality of client applications over a predetermined duration. Each audit log for a client application includes a first audit message and a second audit message with at least a portion of information from each audit message different from each other. The method then includes extracting, by the computing device, information from the first audit message of each client application that includes an audit identification and a connecting IP address associated with the corresponding client application. The method additionally includes extracting, by the computing device, information from the second audit message of each client application that includes an audit identification and a process identification of the corresponding client application. The method further includes determining, by the computing device, one or more client applications having a connecting IP address from the first audit message that matches the IP address of the service application. The method further includes determining, by the computing device, for each of the one or more matched client applications, the process identification from the second audit message of the corresponding matched client application, where each process identification identifies the corresponding client application as being connected to and consuming the service application.

The invention, in another aspect, features a computer-implemented system for identifying connection between at least one application in a plurality of client applications within a multi-tenant network and a service application hosted on a server. The computer-implemented system comprises a computing device having a memory for storing instructions that, when executed, configure the computer-implemented system to provide a preprocessing module configured to determine an IP address associated with the service application. The system also provides an audit module configured to generate a plurality of audit logs that track activities for respective ones of the plurality of client applications over a predetermined duration. Each audit log for a client application includes a first audit message and a second audit message with at least a portion of information from each audit message different from each other. The system further provides an analysis module configured to extract information from the first audit message of each client application that includes an audit identification and a connecting IP address associated with the corresponding client application and extract information from the second audit message of each client application that includes an audit identification and a process identification of the corresponding client application. The analysis module is configured to determine one or more client applications having a connecting IP address from the first audit message that matches the IP address of the service application. The analysis module is further configured to determine for each of the one or more matched client applications, the process identification from the second audit message of the corresponding matched client application, where each process identification identifies the corresponding client application as being connected to and consuming the service application Any of the above aspects can include one or more of the following features. In some embodiments, determining the process identification of each of the matched client applications includes extracting the audit identification from the first audit message of the audit log corresponding to the matched client application, obtaining the second audit message of the audit log with the same audit identification, and extracting, from the second audit message, the process identification of the matched client application. In some embodiments, for each of the one or more matched client applications, an application identification from the second audit message of the corresponding matched client application is determined.

In some embodiments, evaluation is performed regarding whether each process identification of the matched client application is a container and a docker inspection process is executed to extract container information associated with the matched client application. In some embodiments, a report is generated that includes a list of the one or more process identifications for respective ones of the one or more matched client applications.

In some embodiments, the first and second audit messages have different message types. The first audit message captures the connecting IP address information associated with the corresponding client application and the second audit message captures the process identification associated with the corresponding client application. In some embodiments, the first audit message is a 'SOCKADDR' message configured to maintains a network log, and the second audit message is a "SYSCALL" message configured to maintain a system log.

In some embodiments, one or more audit rules for each audit log are configured to track the activities of the corresponding client applications. In some embodiments, a security layer is absent from the service application.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method for identifying connections between client applications and a service application within the computing environment of FIG. 1, according to some embodiments of the present invention.

FIG. 3 shows an exemplary audit log file generated for a client application, according to some embodiments of the present invention.

DETAILED DESCRIPTION

Figure 1:
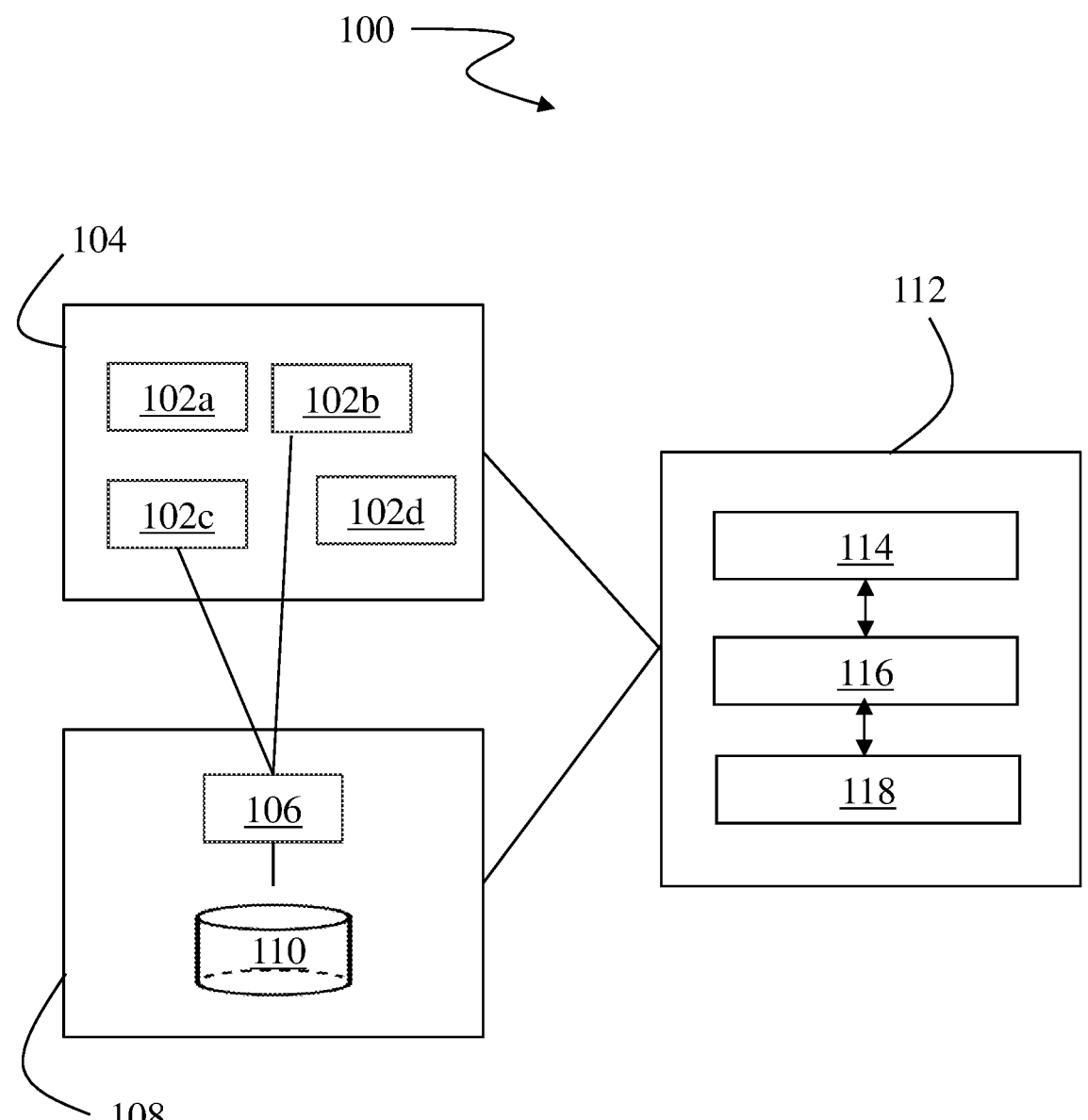
FIG. 1 is a block diagram of a computing environment in which an identification system is used to identify connections between client application(s) in a multi-tenant network and a service application hosted on a server, according to some embodiments of the present invention.

FIG. 1 is a block diagram of a computing environment 100 in which an identification system 112 is used to identify connections between client application(s) 102 in a multi-tenant network 104 and a service application 106 hosted on a server 108, according to some embodiments of the present invention. As shown, a single instance of the service application 106, including its underlying database 110 and other supporting infrastructure, can serve multiple client applications 102a-d. In the exemplary computing architecture of FIG. 1, even though there are four client applications 102a-d, only two of these client applications 102b, c are actively consuming (e.g., sending traffic to) the service application 106. The identification system 112 is configured to identify these consuming client applications 102b, c from the plurality of client applications 102a-d in the multi-tenant network 104.

The identification system 112 is a combination of hardware, including one or more processors and one or more physical memory modules and specialized software engines that execute on the processor of the identification system 112, to receive data from other components of the computing environment 100 (e.g., from the multi-tenant network 104 and the server 108) and perform the connection identification functions as described herein. As shown, the identification system 112 executes a preprocessing module 114, an audit module 116 and an analysis module 118. These subcomponents and their functionalities are described below in detail. In some embodiments, the various components of the identification system 112 are specialized sets of computer software instructions programmed onto a dedicated processor in the identification system 112 and can include specifically designated memory locations and/or registers for executing the specialized computer software instructions.

In some embodiments, the various components of the computing environment 100 communicate with each other over a communication network (not shown). The network may be a local network, such as a LAN, or a wide area network, such as the Internet and/or a cellular network. In some embodiments, the network is comprised of several discrete networks and/or sub-networks (e.g., cellular to Internet) that enable the various components to communicate with each other.

FIG. 2 is a flow diagram of a computerized method 200 for identifying connections between client applications 102 and a service application 106 within the computing environment 100 of FIG. 1, according to some embodiments of the present invention. At step 202, the preprocessing module 114 of the identification system 112 determines an IP address associated with the service application 106. In some embodiments, a security layer is absent from the service application 106.

At step 204, the audit module 116 generates multiple audit logs for respective ones of the client applications 102 in the multi-tenant network 104. Each audit log tracks activities of the corresponding client application 102 over a predetermined duration. In general, the audit logs are user configurable. For example, a user of the identification system 112 can (i) specify the IP address(es) and/or hostname(s) associated with the client applications 102 for which connections need to be tracked, (ii) the one or more email addresses to which tracking and analytical results should be sent, and/or (ii) the timeframe, such as 30 minutes or 1 hour, during which the audit module 116 captures activity data associated with the client applications 102 of interest. In addition, the user can configure an audit log to append, remove or modify one or more audit rules for the purpose of tracking activities, e.g., network (SOCKADDR) activities and system call (SYSCALL) activities, associated with the interested client applications 102. For each audit log, the audit rules are adapted to capture at run time the activities (SOCKADDR, SYSCALL) the user is interested in for the IP address and/or hostname of the client application 102 of interest to the user.

FIG. 3 shows an exemplary audit log file 300 generated for a client application 102, according to some embodiments of the present invention. As shown, each audit log file 300 includes at least a first audit message 302 and a second audit message 304 with at least a portion of information from the audit messages 302, 304 different from each other. In some embodiments, the first and second audit messages have different message types. As shown in FIG. 3, the first audit message 302 of the audit log 300 can be a 'SOCKADDR" message configured to maintain a network log and the second audit message 304 of the audit log 300 can be a "SYSCALL" message configured to maintain a system log. In some embodiments, the first audit message can capture the connecting IP address information associated with the corresponding client application 102 and the second audit message can capture the process identification associated with the corresponding client application 102. In some embodiments, the connecting IP address information and the process identification information are not present in the same audit message.

Referring back to the flow diagram 200 of FIG. 2, after the audit logs for the client applications 102 of interest are generated, the analysis module 118 is configured to parse information from the first audit message of each client application 102 to extract an audit identification and a connecting IP address associated with the corresponding client application (step 206). For example, the analysis module 118 can parse the "SOCKADDR" message 302 of the audit log file 300 of FIG. 3 to extract the audit identification number 306, which is "395313," and the IP address 308, which is "10.93.11.7." In addition, the analysis module 118 is configured to parse information from the second audit message of each client application 102 to extract an audit identification and a process identification associated with the corresponding client application (step 208). Again, using the audit log file 300 of FIG. 3 as an example, the analysis module 118 can parse the "SYSCALL" message 304 to extract the audit identification number 310, which is "395313," and the process identification number 312, which is "19057." In some embodiments, the audit identification number 306 extracted from the "SOCKADDR" message 302 is the same as the audit identification number 310 extracted from the "SYSCALL" message 304 as these messages 302, 304 are from the same audit log file 310 for the same client application 102.

At step 210, the analysis module 118 is configured to determine those client applications 102 in the multi-tenant network 104 having a connecting IP address (as determined from the first audit message of an audit log at step 206) that matches the IP address of the service application 106 (determined at step 202). If no match is found, that means that none of the client applications 102 in the multi-tenant network 104 is connecting to and consuming the service application 106 during the monitored period.

On the other hand, if there is at least one match, that means each matched client application 102 has been connected to and consuming the service application 106. At step 210, fore each of the one or more matched client applications 102, the analysis module 118 is configured to determine the process identification from the second audit message of the corresponding matched client application 102, where the process identification provides an identity of the corresponding client application 102. More specifically, determining the process identification of a matched client application 102 includes (1) extracting the audit identification from the first audit message (e.g., the SOCKADDR message 302) of the audit log corresponding to the matched client application, (2) obtaining the second audit message (e.g., the SYSCALL message) of the audit log with the same audit identification, and (3) extracting from the second audit message the process identification of the matched client application 102. Using the log file 300 of FIG. 3 as an example, if the analysis module 118 determines that the IP address 306 of the "SOCKADDR" message 302 matches the IP address of the service application 106, the analysis module 118 then obtains the audit identification 306 from the same message 302. Then, the analysis module 118 locates the "SYSCALL" message 304 with the same audit identification 310 and obtains the process identification 312 from the "SYSCALL" message 304. In some embodiments, the analysis module 118 also extract an application identification (not shown) of the matched client application 102 from its second/SYSCALL message 304 for identifying the client application 102.

In some embodiments, the analysis module 118, after determining the process identification of each matched client application 102 (from step 210), is configured to further determine whether each process identification of the matched client application 102 is a container. The analysis module 118 can execute a docker inspection process to extract container information associated with the matched client application 102 if it is determined that the matched client application 102 is a container. Exemplary information extracted for each container include a container identification and a container name.

In some embodiments, the identification system 112 is configured to generate a report with a list of the one or more process identifications of the matched client applications 102 and send the report to a user of the identification system 112. Optionally, the report can also include corresponding ones of the container information and/or application identification of the matched client applications 102. The report thus provides the user with a list of client applications 102 that connected to/consumed the service application 106 of interest during a user-specified time period.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular

8

(POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for identifying connection between at least one application in a plurality of client applications within a multi-tenant network and a service application hosted on a server, the method comprising:

determining, by a computing device, an IP address associated with the service application;

generating, by the computing device, a plurality of audit logs that track activities for respective ones of the plurality of client applications over a predetermined duration, wherein each audit log for a client application includes a first audit message and a second audit message with at least a portion of information from each audit message different from each other;

extracting, by the computing device, information from the first audit message of each client application that includes an audit identification and a connecting IP address associated with a corresponding client application from the plurality of client applications;

extracting, by the computing device, information from the second audit message of each client application that includes an audit identification and a process identification of the corresponding client application;

determining, by the computing device, one or more client applications having a connecting IP address from the first audit message that matches the IP address of the service application;

determining, by the computing device, for each of the one or more matched client applications, the process identification from the second audit message of the corresponding matched client application, wherein each process identification identifies the corresponding client application as being connected to and consuming the service application;

evaluating, by the computing device, whether each process identification of the matched client application is a container; and executing, by the computing device, a docker inspection process to extract container information associated with the matched client application.

2. The computerized method of claim 1, wherein determining the process identification of each of the matched client applications comprises:

extracting the audit identification from the first audit message of the audit log corresponding to the matched client application;

obtaining the second audit message of the audit log with the same audit identification; and extracting, from the second audit message, the process identification of the matched client application.

3. The computerized method of claim 1, further comprising generating, by the computing device, a report including a list of the one or more process identifications for respective ones of the one or more matched client applications.

4. The computerized method of claim 1, wherein the first and second audit messages have different message types, wherein the first audit message captures the connecting IP address information associated with the corresponding client application and the second audit message captures the process identification associated with the corresponding client application.

5. The computerized method of claim 1, wherein the first audit message is a 'SOCKADDR" message configured to maintains a network log and the second audit message is a "SYSCALL" message configured to maintain a system log.

6. The computerized method of claim 1, further comprising determining, for each of the one or more matched client applications, an application identification from the second audit message of the corresponding matched client application.

7. The computerized method of claim 1, further comprising configuring one or more audit rules for each audit log to track the activities of the corresponding client applications.

8. The computerized method of claim 1, wherein a security layer is absent from the service application.

9. A computer-implemented system for identifying connection between at least one application in a plurality of client applications within a multi-tenant network and a service application hosted on a server, the computer-implemented system comprising a computing device having a memory storing instructions, wherein the instructions, when executed, configure the computer-implemented system to provide:

a preprocessing module configured to determine an IP address associated with the service application;

an audit module configured to generate a plurality of audit logs that track activities for respective ones of the plurality of client applications over a predetermined duration, wherein each audit log for a client application includes a first audit message and a second audit message with at least a portion of information from each audit message different from each other; and an analysis module configured to:

extract information from the first audit message of each client application that includes an audit identification and a connecting IP address associated with a corresponding client application from the plurality of client applications;

extract information from the second audit message of each client application that includes an audit identification and a process identification of the corresponding client application;

determine one or more client applications having a connecting IP address from the first audit message that matches the IP address of the service application;

determine for each of the one or more matched client applications, the process identification from the second audit message of the corresponding matched client application, wherein each process identification identifies the corresponding client application as being connected to and consuming the service application;

evaluate whether each process identification of the matched client application is a container; and execute a docker inspection process to extract container information associated with the matched client application.

10. The computer-implemented system of claim 9, wherein the analysis module, when determining the process identification of each of the matched client applications, is further configured to:

extract the audit identification from the first audit message of the audit log corresponding to the matched client application;

obtain the second audit message of the audit log with the same audit identification; and extract, from the second audit message, the process identification of the matched client application.

11. The computer-implemented system of claim 9, wherein the computer-implemented system is further configured to generate a report including a list of the one or more process identifications for respective ones of the one or more matched client applications.

12. The computer-implemented system of claim 9, wherein the first and second audit messages have different message types, wherein the first audit message captures the connecting IP address associated with the corresponding client application and the second audit message captures the process identification associated with the corresponding client application.

13. The computer-implemented system of claim 9, wherein the first audit message is a 'SOCKADDR" message configured to maintains a network log and the second audit message is a "SYSCALL" message configured to maintain a system log.

14. The computer-implemented system of claim 9, wherein the analysis module is further configured to determine, for each of the one or more matched client applications, an application identification from the second audit message of the corresponding matched client application.

15. The computer-implemented system of claim 9, wherein the audit module is further configured to add one or more audit rules for each audit log to track the activities of the corresponding client applications.

16. The computer-implemented system of claim 9, wherein a security layer is absent from the service application.

* * * * *